(12) United States Patent
Ichioka et al.

(10) Patent No.: US 9,638,279 B2
(45) Date of Patent: May 2, 2017

(54) DAMPER AND HANDLE DEVICE HAVING THE SAME

(71) Applicant: PIOLAX, INC., Yokohama-shi (JP)

(72) Inventors: Hiroaki Ichioka, Yokohama (JP); Jun Saito, Yokohama (JP)

(73) Assignee: PIOLAX INC., Yokohama-Shi, Kanagawa (JP)

( * ) Notice: Subject to any disclaimer, the term of this patent is extended or adjusted under 35 U.S.C. 154(b) by 194 days.

(21) Appl. No.: 14/508,868

(22) Filed: Oct. 7, 2014

(65) Prior Publication Data
US 2015/0102620 A1   Apr. 16, 2015

(30) Foreign Application Priority Data

Oct. 10, 2013  (JP) ................. 2013-213233

(51) Int. Cl.
*A45C 3/00* (2006.01)
*F16F 9/12* (2006.01)
*B60N 3/02* (2006.01)

(52) U.S. Cl.
CPC ............... *F16F 9/12* (2013.01); *B60N 3/023* (2013.01)

(58) Field of Classification Search
CPC ...... F16F 9/12; F16F 9/53; F16F 9/145; F16F 9/93207; F16F 9/3235; F16F 9/34; F16F 9/346; E05Y 2201/254; E05Y 2201/266; E05Y 2201/21
See application file for complete search history.

(56) References Cited

U.S. PATENT DOCUMENTS

| RE19,631 E  * | 7/1935  | Peo ......................... | F16F 9/145 188/308 |
| 2,914,943 A  * | 12/1959 | Ballard .................... | G01F 1/80 73/861.353 |
| 5,178,242 A  * | 1/1993  | Nakamura .............. | F16F 9/468 188/282.1 |
| 6,267,040 B1 * | 7/2001  | Sonoda .................. | B62D 5/062 91/420 |
| 6,662,683 B1 * | 12/2003 | Takahashi .............. | B60N 3/023 188/290 |
| 2010/0282553 A1* | 11/2010 | Cultraro .................. | F16F 9/145 188/290 |

FOREIGN PATENT DOCUMENTS

| JP | 2002-221247 A | 8/2002 | |
| JP | WO 2015115487 A1 * | 8/2015 | ................ F16F 9/12 |

* cited by examiner

*Primary Examiner* — Victor Batson
*Assistant Examiner* — Matthew Sullivan
(74) *Attorney, Agent, or Firm* — McGinn IP Law Group, PLLC.

(57) ABSTRACT

An embodiment provides a damper a damper including: a housing; a rotor; and a sealing member. The housing includes outer and inner cylinder portions to define a filling space portion therebetween for filling with a viscose fluid. The rotor includes a head portion and a cylinder portion extended downwardly therefrom so as to be inserted into the filling space portion. The sealing member seals the filling space portion. The rotor further includes axially-extending first and second groove portions provided on outer and inner peripheral surfaces of the cylinder portion near the bottom portion thereof. At least one of the first groove portions includes a communicating portion which communicates the inside and the outside of the rotor, and the second groove portion is apart from the communicating portion in a circumferential direction.

15 Claims, 6 Drawing Sheets

DAMPER AND HANDLE DEVICE HAVING THE SAME

CROSS-REFERENCE TO RELATED APPLICATION(S)

This application claims priority from Japanese Patent Application No. 2013-213233 filed on Oct. 10, 2013, the entire contents of which are incorporated herein by reference.

FIELD

An aspect of the present invention relates to a damper producing torque by relative rotation of a housing and a rotor, and a handle device having the damper.

BACKGROUND

For example, in a vehicle, a handle device to be gripped by the passenger is provided to in-vehicle wall surfaces of a passenger seat and backseats. The handle device includes a grip portion provided rotatably, a spring portion arranged to urge the grip portion in a given rotational direction, and a damper arranged to damp the rotation of the grip portion.

For example, JP-2002-221247-A discloses an assist grip device including a rotary damper. This rotary damper includes a housing having an annular groove, a rotor having a main portion to be inserted into the annular groove and relatively rotatable to the housing, silicone oil filled in the annular groove, and sealing members for sealing the space between the rotor and the housing.

In JP-2002-221247-A, silicone oil is filled in the annular groove. In the annular groove, bubbles may be left in the silicone oil when being filled, or bubbles may enter the annular groove when the silicone oil leaks due to thermal expansion. When the bubbles spread in the annular groove at the time of relative rotation of the housing and the rotor, resistance by silicone oil cannot be obtained at the part where the bubbles spread, thereby reducing the torque to be produced by the damper. Since the annular groove is sealed in order to prevent leakage of the silicone oil, it is difficult to remove the bubbles after the damper has been assembled.

SUMMARY

One object of the present invention is to provide a technique for preventing reduction in torque during operation of a damper.

An aspect of the present invention provides
a damper including:
a housing that includes
an outer cylinder portion,
an inner cylinder portion provided inwardly of the outer cylinder portion,
a bottom portion arranged to connect the outer cylinder portion and the inner cylinder portion and
a filling space portion defined between the outer cylinder portion and the inner cylinder portion, a viscose fluid being filled in the filling space portion;
a rotor that includes
a head portion and
a rotor cylinder portion extended downwardly from the head portion and disposed in the filling space portion; and
a sealing member arranged to seal the filling space portion,
wherein the rotor further includes
first groove portions provided on an outer peripheral surface of the rotor cylinder portion near the bottom portion apart from the sealing member so as to extend in an axial direction and
a second groove portion provided on an inner peripheral surface of the rotor cylinder portion near the bottom portion apart from the sealing member so as to extend in the axial direction, and
wherein at least one of the first groove portions includes a communicating portion which communicates the inside and the outside of the rotor, and the second groove portion is apart from the communicating portion in a circumferential direction.

According to the present embodiment, bubbles in the filling space portion that were left at the time of assembling the damper can be collected at the first groove portions and the second groove portion, which can prevent the bubbles from spreading onto a peripheral surface of the rotor. The bubbles on the outer side of the rotor can be moved to the inner side of the rotor through the communicating portion, and be made to stay in the second groove portion, which can prevent reduction in torque during operation of the damper. Because the second groove portion is apart from the communicating portion in the circumferential direction, the bubbles can be prevented from moving from the inner side to the outer side of the rotor.

Another aspect of the present invention provides
a handle device including:
a grip portion provided rotatable from a normal state to a usage state and arranged to be gripped by a user;
a shaft portion arranged to pivotally support the grip portion;
a spring portion arranged to urge the grip portion in a direction of returning from the usage state to the normal state; and
a damper arranged to damp a rotational movement of the grip portion,
wherein the damper includes:
a housing that includes
an outer cylinder portion,
an inner cylinder portion provided inwardly of the outer cylinder portion,
a bottom portion arranged to connect the outer cylinder portion and the inner cylinder portion and
a filling space portion defined between the outer cylinder portion and the inner cylinder portion, a viscose fluid being filled in the filling space portion;
a rotor that includes
a head portion and
a rotor cylinder portion extended downwardly from the head portion and disposed in the filling space portion; and
a sealing member arranged to seal the filling space portion,
wherein the rotor further includes
first groove portions provided on an outer peripheral surface of the rotor cylinder portion near the bottom portion apart from the sealing member so as to extend in an axial direction and
a second groove portion provided on an inner peripheral surface of the rotor cylinder portion near the bottom portion apart from the sealing member so as to extend in the axial direction, and
wherein at least one of the first groove portions includes a communicating portion which communicates the inside and the outside of the rotor, and the second groove portion is apart from the communicating portion in a circumferential direction.

According to the present embodiment, bubbles in the filling space portion that were left at the time of assembling the damper can be collected at the first groove portions and the second groove portion, which can prevent the bubbles from spreading onto a peripheral surface of the rotor. The bubbles on the outer side of the rotor can be moved to the inner side of the rotor through the communicating portion, and be made to stay in the second groove portion, which can prevent reduction in torque during operation of the damper. Because the second groove portion is apart from the communicating portion in the circumferential direction, the bubbles can be prevented from moving from the inner side to the outer side of the rotor.

According to the present invention, reduction in torque during operation of the damper can be prevented.

DETAILED DESCRIPTION

A damper includes a housing filled with oil as a viscose fluid, and a rotor inserted in the housing. The damper produces torque by shear resistance and agitating resistance at the time of relative rotation of the housing and the rotor.

Bubbles may be left in a filling space portion when filling the viscose fluid at the time of assembling the damper, or bubbles may enter the housing upon volumetric change of the viscose fluid changes depending on the temperature. The bubbles may spread onto the peripheral surface of the rotor by being pressurized at the time of relative rotation of the housing and the rotor. Thus, the spread of the bubbles may change the shear resistance and may reduce the torque. That is, if the relative rotation of the housing and the rotor is performed many times, the torque produced by the damper may be reduced.

In order to solve these problems, first groove portions and a second groove portion are provided on the inner and outer peripheral surfaces of the rotor to collect the bubbles at the groove portions, which can prevent the bubbles from spreading onto the peripheral surfaces of the rotor. Further, the pressure of viscose fluid on the outer peripheral side of the rotor in the filling space portion is increased by centrifugal force at the time of rotation, so that bubbles that are lighter than the viscose fluid can be moved to the inner side of the rotor through a communicating portion provided to the rotor. The pressure of viscose fluid on the inner side of the rotor is lower than the pressure of viscose fluid on the outer side, so that the change in shear resistance by the bubbles that have moved to the inner side of the rotor becomes small. In addition, the moment on the outer side of the rotor is larger than the moment on the inner side of the rotor. Thus, stabilizing the production of torque on the outer side of the rotor can prevent reduction in torque as a whole of the damper. Because the second groove portion is provided on the inner peripheral surface of the rotor, bubbles can be collected at the second groove portion, which can prevent the bubbles from spreading onto the peripheral surfaces of the rotor. In addition, because the second groove portion is distanced from the communicating portion, the bubbles can be prevented from moving from the inner side to the outer side of the rotor even when the operation of the damper is completed. That is, the bubbles can be blocked in the second groove portion provided on the inner peripheral surface of the rotor. Thus, reduction in torque during operation of the damper can be prevented.

Figure 1:
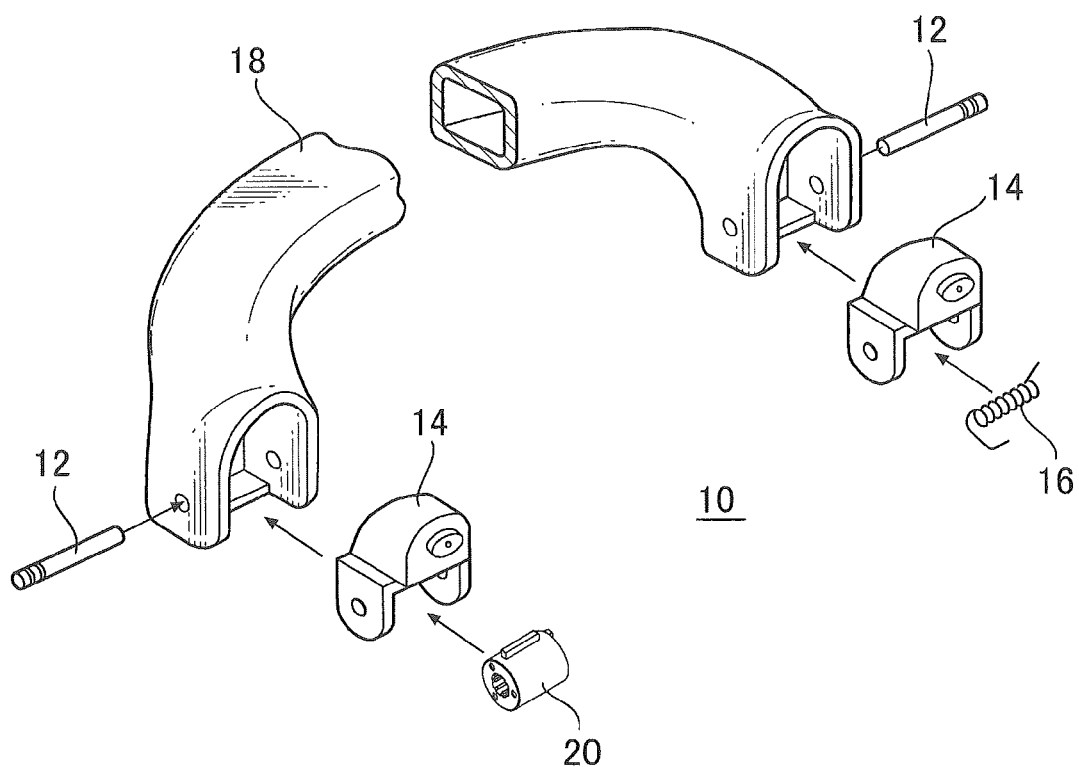
FIG. 1 is an assembly drawing of a handle device according to an embodiment.

FIG. 1 is an assembly drawing of a handle device 10 according to an embodiment. The handle device 10 includes shaft portions 12, holding portions 14, a spring portion 16, a grip portion 18, and a damper 20. The handle device 10 is provided rotatably to an in-vehicle wall surface. The holding portions 14 hold the spring portion 16 and the damper 20. The spring portion 16 urges the grip portion 18 such that the grip portion 18 is folded to the in-vehicle wall surface. The grip portion 18 is gripped by a user. The shaft portions 12 pivotally support the grip portion 18 in a rotatable manner.

A normal state is defined as a state where the grip portion 18 is folded to the in-vehicle wall surface or a state where the grip portion 18 is close to the in-vehicle wall surface for resting. A usage state is defined as a state where the grip portion 18 is rotated from the normal state to be apart from the in-vehicle wall surface. The spring portion 16 urges the grip portion 18 in a rotational direction rotating from the usage state to the normal state.

In using the handle device 10, the user holds the grip portion 18 to rotate the shaft portions 12. After use, the user releases the hand from the grip portion 18 to put back the grip portion 18 to the original rotational position. The grip portion 18 is urged by the spring portion 16 to return toward the in-vehicle wall surface. In order to reduce an impact noise when the grip portion 18 is brought into contact with the wall surface, the speed of rotation of the grip portion 18 is slowed down by the damper 20.

Figure 2A:
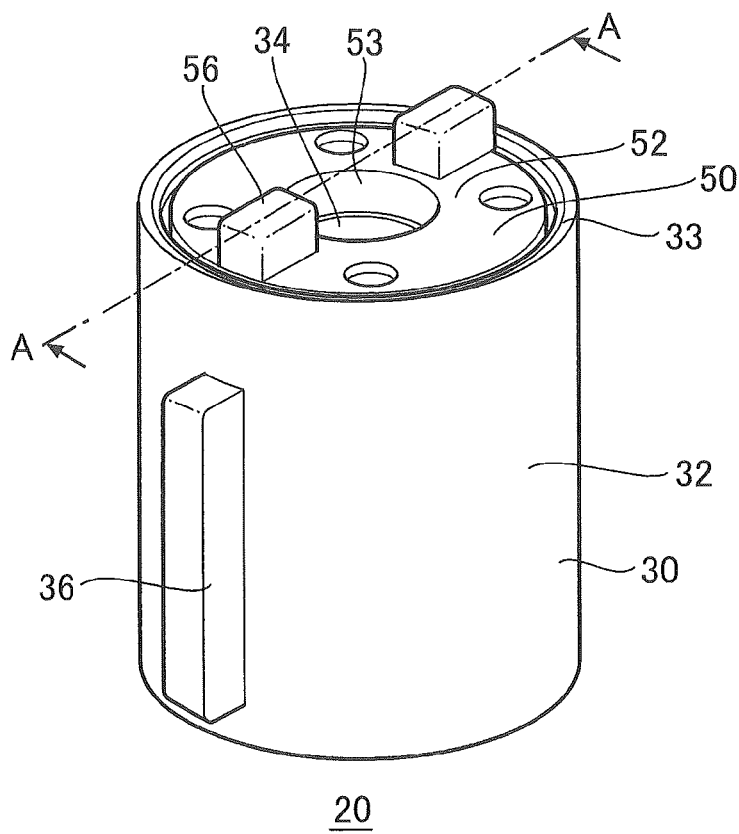
FIGS. 2A and 2B are perspective views of a damper according to the embodiment.
Figure 2B:
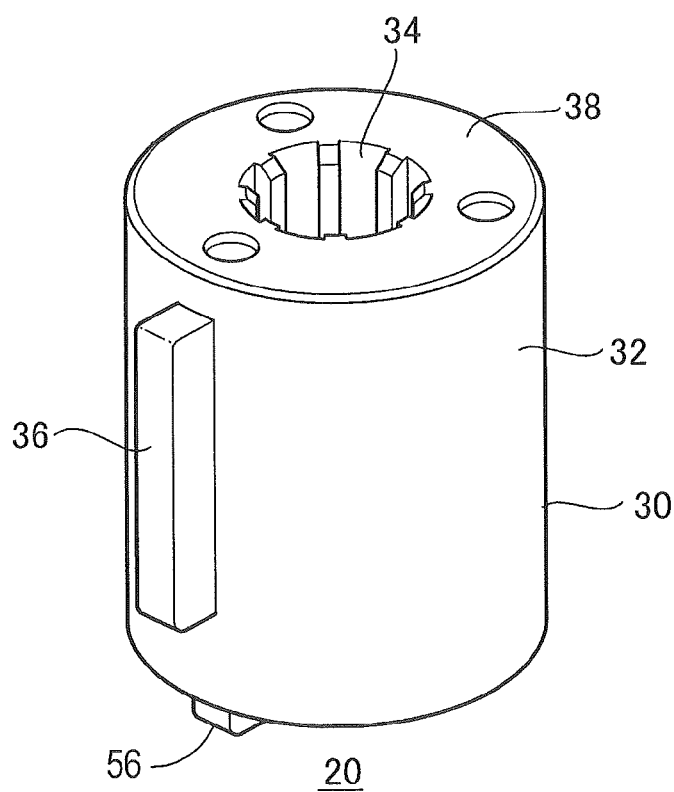

FIGS. 2A and 2B are perspective views of the damper 20 according to the embodiment. FIG. 2A is a perspective view of the damper 20 on the side of an opening portion 33. FIG. 2B is a perspective view of the damper 20 on the side of a bottom portion 38. Same or equivalent components and members shown in the drawings are provided with same reference numerals, and repeated descriptions of the same or equivalent components and members are omitted as appropriate.

The damper 20 includes a housing 30, a rotor 50, a first O-ring 80, and a second O-ring 82. The rotor 50, the first O-ring, and the second O-ring are housed in the housing 30. The housing 30 and the rotor 50 have a cylindrical shape, and the shaft portion 12 is inserted into the center of the housing 30 and the rotor 50.

The housing 30 includes an outer cylinder portion 32, the opening portion 33, an inner cylinder portion 34, a protruding portion 36, and the bottom portion 38. The housing 30 has a double structure consisting of the outer cylinder portion 32 and the inner cylinder portion 34. A viscose fluid is filled between the outer cylinder portion 32 and the inner cylinder portion 34. Liquid such as oil is used as the viscose fluid.

A cylinder portion 54 of the rotor 50 is inserted between the outer cylinder portion 32 and the inner cylinder portion 34. The housing 30 and the rotor 50 are relatively rotatable to each other, so that the damper 20 generates a damping force given by viscosity resistance at the time of the relative rotation.

Figure 3A:
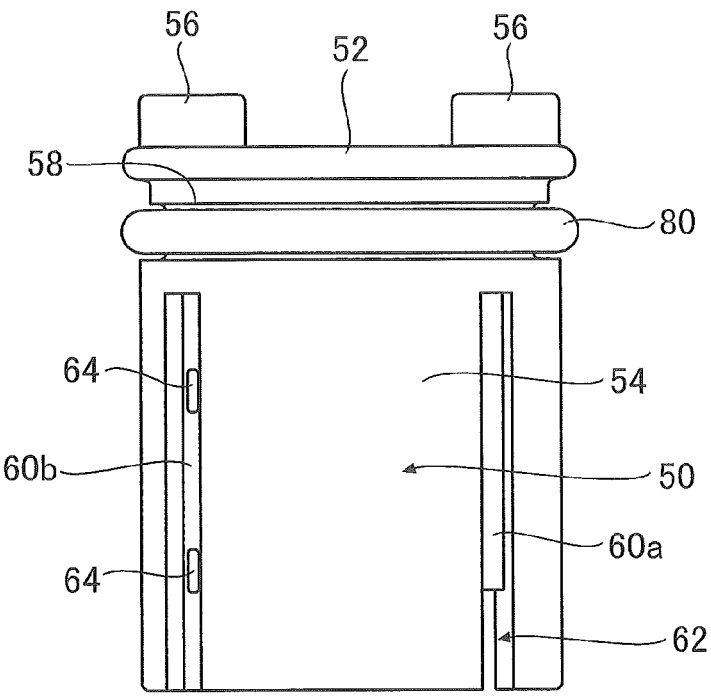
FIG. 3A is a front view of a rotor.
Figure 3B:
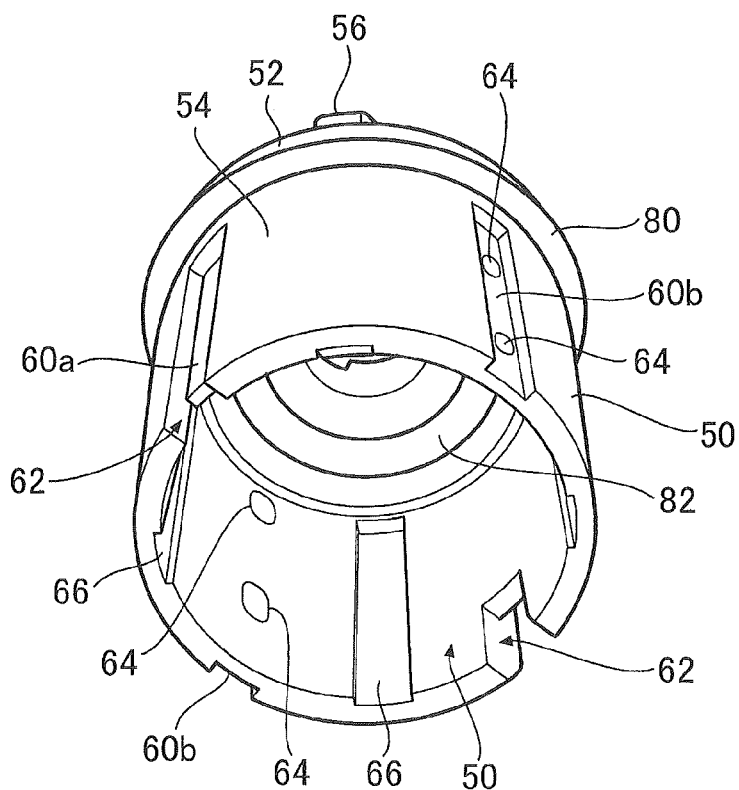
FIG. 3B is a perspective view of the rotor.
Figure 4A:
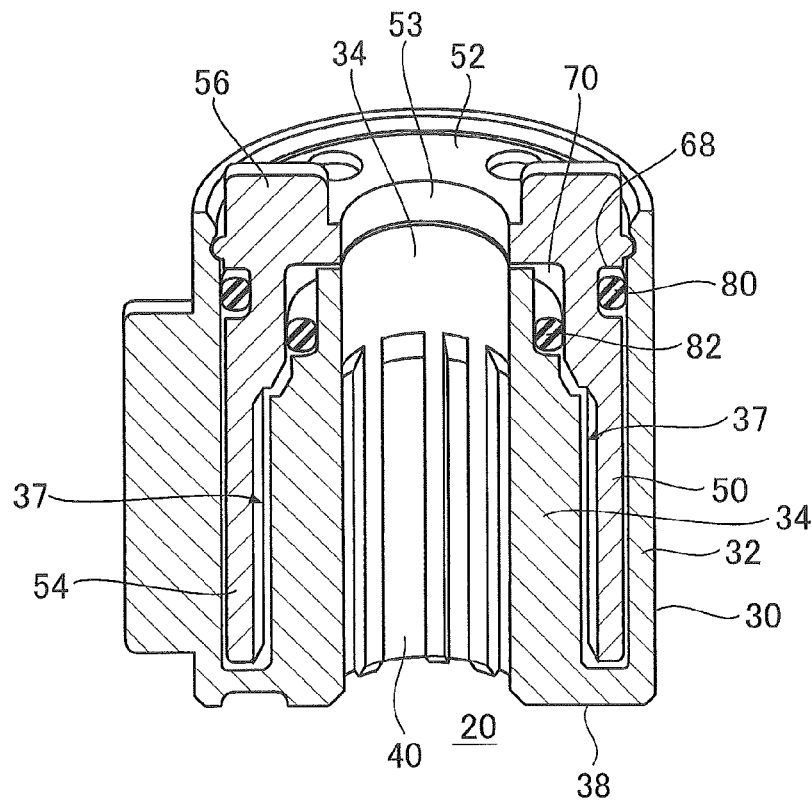
FIG. 4A is a cross-sectional view of the damper taken along the line A-A of FIG. 2A.
Figure 4B:
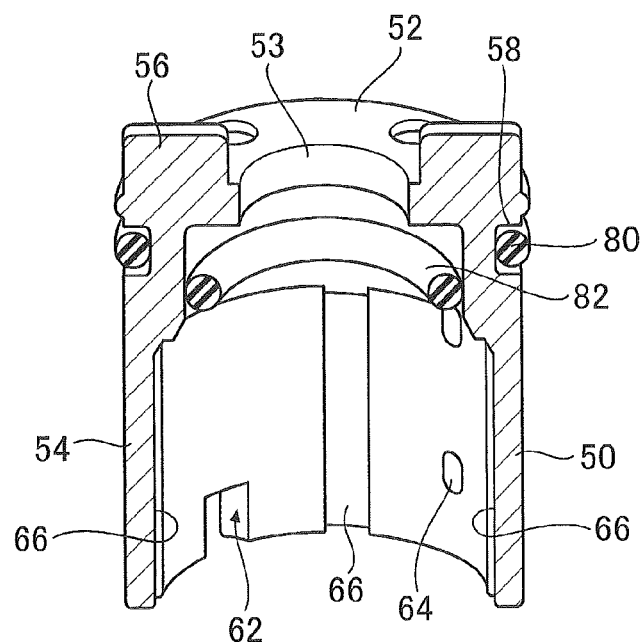
FIG. 4B is a cross-sectional view of the rotor, a first O-ring, and a second O-ring.

FIG. 3A is a front view of the rotor 50, and FIG. 3B is a perspective view of the rotor 50. FIG. 4A is a cross-sectional view of the damper 20 taken along the line A-A of FIG. 2A, and FIG. 4B is a cross-sectional view of the rotor 50, a first O-ring 80, and a second O-ring 82. FIG. 4B cross-sectionally shows the damper 20 of FIG. 4A by removing the housing 30.

As shown in FIG. 4A, the housing 30 includes a filling space portion 37 that is defined between the outer cylinder portion 32 and the inner cylinder portion 34 and in which the viscose fluid is filled. The filling space portion 37 has a cylindrical shape like the outer cylinder portion 32 and the inner cylinder portion 34. The first O-ring 80 is disposed on the outer side of the rotor 50, and the second O-ring 82 is disposed on the inner side of the rotor 50. The first O-ring 80 and the second O-ring 82 (referred to as the O-rings when they are not distinguished from each other) seal the filling space portion 37. The first O-ring 80 and the second O-ring 82 are disposed between the rotor 50 and the housing 30. The first O-ring 80 and the second O-ring 82 function as the sealing member arranged to prevent leakage of the viscose fluid, and are made from a rubber material.

The first O-ring 80 and the second O-ring 82 have substantially the same wire diameter. The outer cylinder portion 32 and the inner cylinder portion 34 are connected at a one-end portion by the bottom portion 38. The inner cylinder portion 34 provided inwardly of the outer cylinder portion 32 includes a groove portion 40 extending along the axial direction on the inner peripheral surface.

The protruding portion 36 protrudes outwardly in the radial direction on the outer peripheral surface of the outer cylinder portion 32. The protruding portion 36 is brought into contact with the holding portion 14 or an in-vehicle inner wall to limit the rotation of the housing 30.

The rotor 50 includes a head portion 52, the cylinder portion 54, protruding portions 56, an annular concave portion 58, first groove portions 60a, first groove portions 60b, notch portions 62, communicating holes 64, and second groove portions 66. The head potion 52 has a disk shape including a center hole 53. The protruding portions 56 protruding outwardly in the axial direction are disposed on the surface of the head portion 52. The head portion 52 and the protruding portions 56 are exposed from the opening portion 33 of the housing 30.

The protruding portions 56 are brought into contact with the grip portion 18 to limit the rotation of the rotor 50. The cylinder portion 54 extends downwardly from the head portion 52. The annular concave portion 58 is provided on the outer peripheral surface of the cylinder portion 54 near the head portion 52, that is, disposed around the connecting portion between the head portion 52 and the cylinder portion 54. The first O-ring 80 is disposed in the annular concave portion 58.

The cylinder portion 54 includes the first groove portions 60a and the first groove portions 60b (referred to as the first groove portions 60 when they are not distinguished from each other) that are disposed on the outer peripheral surface near the bottom portion 38 apart from the first O-ring 80, that is, on the distal end side, and extend along the axial direction. The first groove portions 60 are formed as concaves on the outer peripheral surface of the cylinder portion 54. Thus, the first groove portions 60 can collect bubbles that are left on the outer peripheral side of the rotor 50. The plural first groove portions 60 are provided in the circumferential direction apart from each other at regular intervals.

The first groove portions 60a each includes the notch portions 62 formed by notching a distal end portion of the cylinder portion 54 at the side of the bottom portion 38. The first groove portions 60b each includes the plural communicating holes 64. The notch portions 62 and the communicating holes 64 function as communicating portions through which the inside of the rotor 50 is communicated with the outside of the rotor 50. Thus, bubbles in the filling space portion 37 that were left at the time of assembling the damper 20 can be moved to the inner side of the rotor 50 through the communicating portions, that is, through the notch portions 62 and the communicating holes 64. Because the notch portions 62 and the communicating holes 64 are provided to the first groove portions 60, bubbles collected at the first groove portions 60 can be easily moved to the notch portions 62 and the communicating holes 64. Then, the bubbles that have moved to the inner side of the rotor 50 are kept in the second groove portions 66, so that reduction in torque during operation of the damper 20 can be prevented.

The first groove portions 60a including the notch portions 62 and the first groove portions 60b including the communicating holes 64 are alternately arranged in the circumferential direction as shown in FIG. 3B. In comparison with a configuration where both of the notch portion 62 and the communicating holes 64 are provided to each of the first groove portions 60a and the first groove portions 60b, the present configuration can prevent reduction in rigidity of the rotor 50. By providing the notch portions 62 at the distal end of the cylinder portion 54 and providing the communicating holes 64 midway of the cylinder portion 54, the notch portions 62 and the communicating holes 64 are disposed at different positions in the axial direction. Thus, bubbles extending in the axial direction can be moved to the inner side of the rotor 50 by the notch portions 62 and the communicating holes 64. As described above, while reduction in rigidity of the rotor 50 can be prevented, performance for collecting bubbles can be improved. By providing the notch portions 62 at the distal end of the cylinder portion 54, the communicating portions of the rotor 50 can be easily processed while bubbles staying at the bottom portion 38 can be easily collected.

The cylinder portion 54 includes the second groove portions 66 that are disposed on the inner peripheral surface near the bottom portion 38 apart from the second O-ring 82, that is, on the distal end side, and extend along the axial direction as shown in FIG. 4B. The second groove portions 66 are apart from the notch portions 62 and the communicating holes 64 in the circumferential direction. Thus, by collecting the bubbles that have moved to the inner side of the rotor 50 through the notch portions 62 and the communicating holes 64 to the second groove portions 66, the bubbles in the second groove portions 66 can be prevented from moving to the outer side of the rotor 50 through the notch portions 62 and the communicating holes 64 when the rotation is completed. If groove portions for collecting bubbles were provided to the housing 30, the groove portions of the housing 30 and the notch portions 62 and the communicating holes 64 of the rotor 50 would be opposed to each other many times at the time of relative rotation of the housing 30 and the rotor 50, and thus, the bubbles in the inner side of the rotor 50 may move to the outer side of the rotor 50 through the notch portions 62 and the communicating holes 64. Providing the first groove portions 60 and the second groove portions 66 to the rotor 50 and making the positions of the first groove portions 60 and the second groove portions 66 different from each other in the circumferential direction can prevent the bubbles from moving to the outer side of the rotor 50 at the time of relative rotation.

A second holding portion 70 for holding the second O-ring 82 is provided on the inner peripheral surface of the rotor 50 and the outer peripheral surface of the inner cylinder portion 34. A first holding portion 68 for holding the first O-ring 80 is provided on the outer peripheral surface of the rotor 50 and the inner peripheral surface of the outer cylinder portion 32. A holding space defined by the second holding portion 70 is longer in the axial direction than the first holding portion 68. The O-rings can move in the axial direction in the holding spaces. The length in the axial direction of the second holding portion 70 is two times as large as or larger than the wire direction of the second O-ring 82. Thus, the bubbles that have moved to the inner side of the rotor 50 can be moved to the space of the second holding portion 70. If the viscose fluid is filled with excess amount in the housing 30, the second holding portion 70 can absorb variation in amount of the viscose fluid. Assembling the damper 20 in a space under reduced pressure can reduce bubbles from being left in the filling space portion 37. When the damper 20 is moved under atmospheric pressure after the assembly, the second O-ring 82 is pulled to the distal end side of the cylinder portion 54 in the second holding portion 70 by a difference in pressure between the inside and the outside.

Figure 5A:
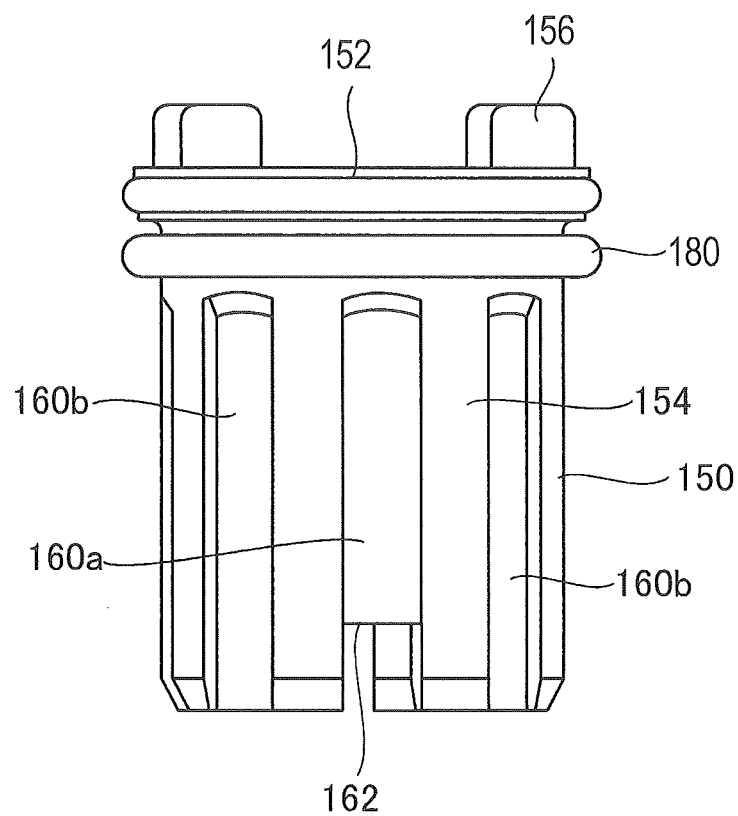
FIGS. 5A and 5B are views for illustrating a rotor according to a modification.
Figure 5B:
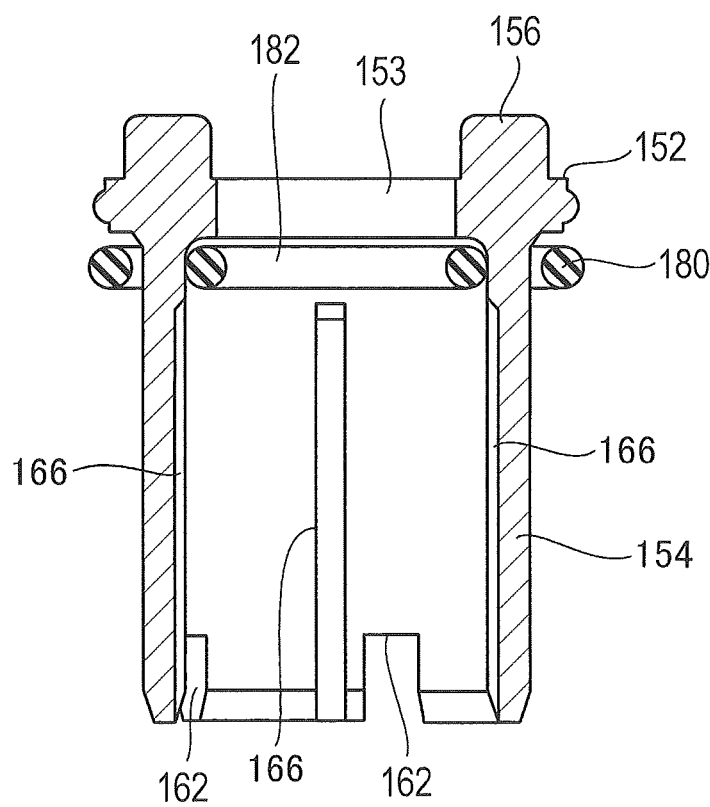
Figure 6:
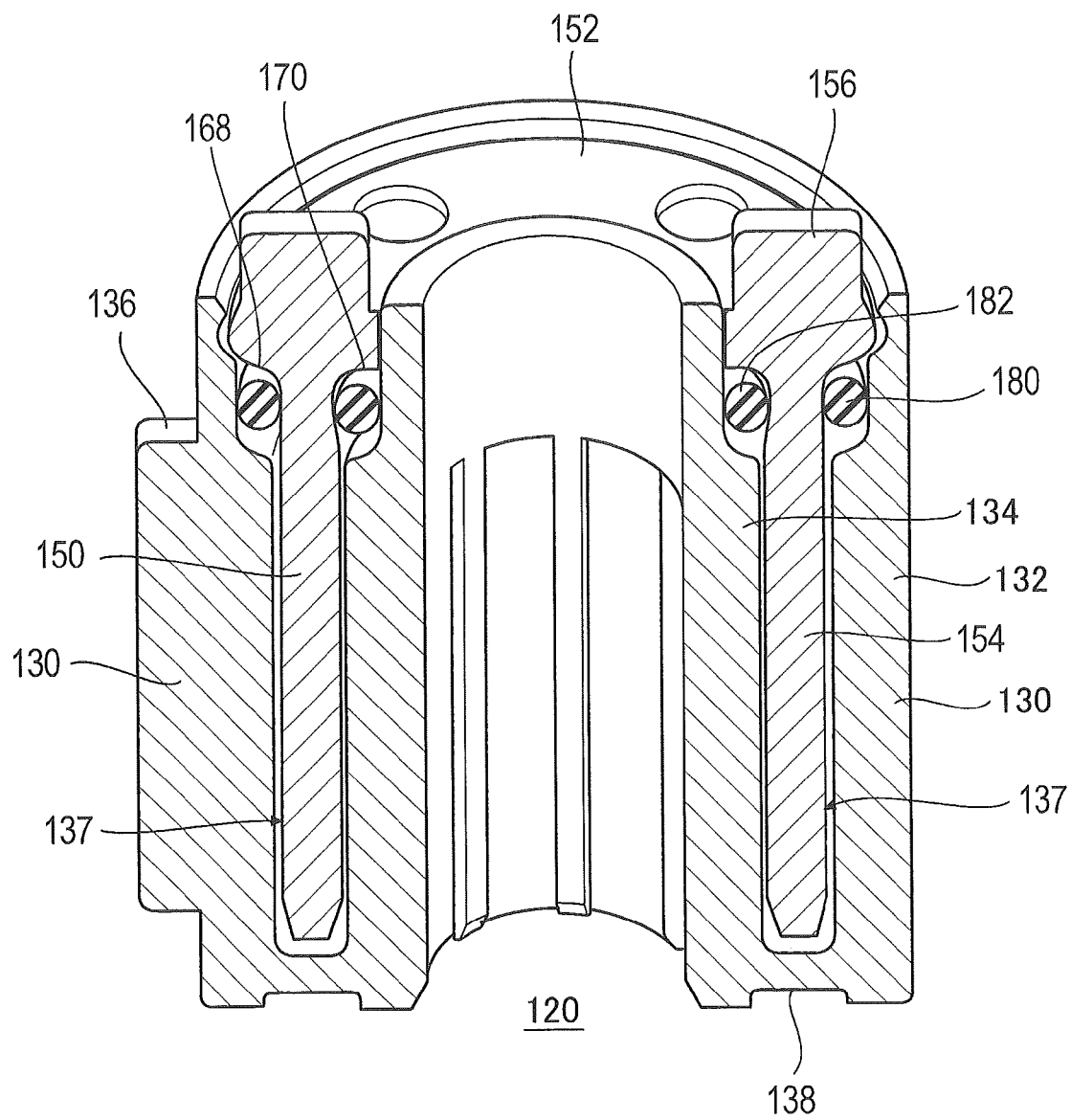
FIG. 6 is a cross-sectional view of the damper according to the modification along the axial direction.

FIGS. 5A and 5B are views for illustrating a rotor 150 according to a modification. FIG. 5A is a front view of the first O-ring 180 and the rotor 150, and FIG. 5B is a cross-sectional view of the rotor 150 taken along the axial direction in the middle. In FIG. 5B, the first O-ring 180 and the second O-ring 182 are shown. FIG. 6 is a cross-sectional view of a damper 120 according to the modification along the axial direction.

The rotor 150 according to the modification is different from the rotor 150 shown in FIGS. 3A and 3B in configuration of groove portions, communicating portions, and holding portions. The rotor 150 includes a head portion 152 and a cylinder portion 154 extended downwardly from the head portion 152. The cylinder portion 154 includes first groove portions 160a and first groove portions 160b (referred to as the first groove portions 160 when they are not distinguished from each other) that are disposed on the outer peripheral surface near the bottom portion 138 apart from the first O-ring 180 to be extended along the axial direction, and second groove portions 166 that are disposed on the inner peripheral surface near the bottom portion 138 apart from the second O-ring 182 to be extended along the axial direction.

A housing 130 includes an outer cylinder portion 132, an inner cylinder portion 134, and a filling space portion 137 having a cylindrical shape and provided between the outer cylinder portion 132 and the inner cylinder portion 134. A cylinder portion 154 of the rotor 150 is inserted into the filling space portion 137.

The first groove portions 160a, the first groove portions 160b, and the second groove portions 166 can collect bubbles that are left in the filling space portion 137. The first groove portions 160a each includes the notch portions 162 formed by notching a distal end portion of the cylinder portion 154 at the side of the bottom portion 138. The notch portions 162 function as communicating portions through which the inside of the rotor 150 is communicated with the outside of the rotor 150. Meanwhile, communicating portions such as the notch portions 162 are not provided to the first groove portions 160b. To be specific, the first groove portions 160a including the notch portions 162 and the first groove portions 160b including no notch portions 162 are alternately arranged in the circumferential direction on the outer peripheral surface of the cylinder portion 154 as shown in FIG. 5A Thus, reduction in rigidity of the rotor 150 on the distal end side can be prevented.

The number of provided first groove portions 160 is eight, which is double in number of the first groove portions 160 of the rotor 150 shown in FIGS. 3A and 3B. Increasing the number of the groove portions of the rotor 150 can increase agitating resistance at the time of relative rotation, which can produce large torque.

The number of provided second groove portions 166 on the inner peripheral surfaces of the cylinder portion 154 is four, which is half of the first groove portions 160 as shown in FIG. 5B. In addition, the second groove portions 166 are apart from the notch portions 162 in the circumferential direction. Thus, the bubbles that have moved to the second groove portions 166 can be prevented from moving to the outer side of the rotor 150 through the notch portions 162.

The present invention is not limited to the embodiments described above, and it is also possible to add modifications such as various kinds of design changes to the embodiments based on the knowledge of those skilled in the art. Embodiments to which such modifications will also fall within the scope of the present invention.

In the present embodiment, the protruding portion 36 of the housing 30 is brought into contact with the holding portion 14 or the in-vehicle inner wall while the protruding portions 56 of the rotor 50 are brought into contact with the grip portion 18, and thereby torque is conveyed to the grip portion 18. However, the present invention is not limited to the present embodiment. For example, a configuration such that the protruding portion 36 of the housing 30 is brought into contact with the grip portion 18 while the protruding portions 56 of the rotor 50 are brought into contact with the holding portion 14 or the in-vehicle inner wall is possible.

In the present embodiment, the grip portion 18 is folded to the in-vehicle wall surface in its normal state. However, the present invention is not limited to the present embodiment. For example, the handle device 10 may include limiting means for limiting rotation of the grip portion 18 at a given rotational position, and the normal state may be defined as a state where the grip portion 18 is at the given rotational position. Being at the given rotational position, the grip portion 18 remains still so as not to jut into the vehicle interior. The limiting means is brought into contact with the grip portion 18 at the given rotational position to limit the rotation.

In the present embodiment, the O-rings are used as the sealing member. However, the present invention is not limited to the present embodiment. For example, T-shaped packings or U-shaped packings may be used as the sealing member to prevent leakage of the viscose fluid from the filling space portion 37 to the outside.

The invention claimed is:
1. A damper comprising:
  a housing that includes:
    an outer cylinder portion;
    an inner cylinder portion provided inwardly of the outer cylinder portion;
    a bottom portion arranged to connect the outer cylinder portion and the inner cylinder portion; and a filling space portion defined between the outer cylinder portion and the inner cylinder portion, a viscose fluid being filled in the filling space portion;
a rotor that includes:
a head portion; and
a rotor cylinder portion extended downwardly from the head portion and disposed in the filling space portion; and
a sealing member arranged to seal the filling space portion,
wherein the rotor further includes:
first groove portions provided on an outer peripheral surface of the rotor cylinder portion near the bottom portion apart from the sealing member so as to extend in an axial direction; and
a second groove portion provided on an inner peripheral surface of the rotor cylinder portion near the bottom portion apart from the sealing member so as to extend in the axial direction,
wherein at least one of the first groove portions includes a communicating portion which communicates the inside and the outside of the rotor, and the second groove portion is apart from the communicating portion in a circumferential direction,
wherein the communicating portion includes a notch portion formed by notching a distal end portion of the rotor cylinder portion at a side of the bottom portion.

2. The damper of claim 1, wherein the first groove portion provided with the communicating portion and the first groove portion provided not with the communicating portion are alternately arranged in the circumferential direction.

3. The damper of claim 1, wherein the communicating portion includes a communicating hole provided to the first groove portion, and
wherein the first groove portion provided with the communicating hole and the first groove portion provided with the notch portion are alternately arranged in the circumferential direction.

4. A damper comprising:
a housing that includes:
an outer cylinder portion;
an inner cylinder portion provided inwardly of the outer cylinder portion;
a bottom portion arranged to connect the outer cylinder portion and the inner cylinder portion; and
a filling space portion defined between the outer cylinder portion and the inner cylinder portion, a viscose fluid being filled in the filling space portion;
a rotor that includes:
a head portion; and
a rotor cylinder portion extended downwardly from the head portion and disposed in the filling space portion; and
a sealing member arranged to seal the filling space portion,
wherein the rotor further includes:
first groove portions provided on an outer peripheral surface of the rotor cylinder portion near the bottom portion apart from the sealing member so as to extend in an axial direction; and
a second groove portion provided on an inner peripheral surface of the rotor cylinder portion near the bottom portion apart from the sealing member so as to extend in the axial direction,
wherein at least one of the first groove portions includes a communicating portion which communicates the inside and the outside of the rotor, and the second groove portion is apart from the communicating portion in a circumferential direction,
wherein the sealing member includes:
a first sealing member disposed on an outer side of the rotor; and
a second sealing member disposed on an inner side of the rotor, and
wherein a holding space for the second sealing member provided between an inner peripheral surface of the rotor and an outer peripheral surface of the inner cylinder portion is longer than a holding space for the first sealing member provided between an outer peripheral surface of the rotor and an inner peripheral surface of the outer cylinder portion in the axial direction.

5. A handle device comprising:
a grip portion provided rotatable from a normal state to a usage state and arranged to be gripped by a user;
a shaft portion arranged to pivotally support the grip portion;
a spring portion arranged to urge the grip portion in a direction of returning from the usage state to the normal state; and
a damper arranged to damp a rotational movement of the grip portion,
wherein the damper comprises:
a housing that includes:
an outer cylinder portion;
an inner cylinder portion provided inwardly of the outer cylinder portion;
a bottom portion arranged to connect the outer cylinder portion and the inner cylinder portion; and
a filling space portion defined between the outer cylinder portion and the inner cylinder portion, a viscose fluid being filled in the filling space portion;
a rotor that includes:
a head portion; and
a rotor cylinder portion extended downwardly from the head portion and disposed in the filling space portion; and
a sealing member arranged to seal the filling space portion,
wherein the rotor further includes:
first groove portions provided on an outer peripheral surface of the rotor cylinder portion near the bottom portion apart from the sealing member so as to extend in an axial direction; and
a second groove portion provided on an inner peripheral surface of the rotor cylinder portion near the bottom portion apart from the sealing member so as to extend in the axial direction,
wherein at least one of the first groove portions includes a communicating portion which communicates the inside and the outside of the rotor, and the second groove portion is apart from the communicating portion in a circumferential direction,
wherein the communicating portion includes a notch portion formed by notching a distal end portion of the rotor cylinder portion at a side of the bottom portion.

6. The damper of claim 1, wherein bubbles from the viscose fluid are collected at at least one of the first groove portions and the second groove portion.

7. The damper of claim 1, wherein bubbles from the viscose fluid are collected at at least one of the first groove portions and the second groove portion, thereby preventing the bubbles from spreading onto peripheral surfaces of the rotor.

8. The damper of claim 1, wherein the filling space portion defined between the outer cylinder portion and the inner cylinder portion is configured such that a pressure of the viscose fluid on an outer side of the rotor cylinder portion is greater than a pressure of viscose fluid on an inner side of the rotor cylinder portion.

9. The damper of claim 1, wherein the housing and the rotor are rotatable with respect to each other.

10. The damper of claim 1, wherein the housing further includes a protruding portion that protrudes outwardly in a radial direction of an outer peripheral surface of the outer cylinder portion.

11. The damper of claim 10, wherein the protruding portion limits a rotation of the housing.

12. The damper of claim 1, wherein the first groove portions are provided in a circumferential direction of the rotor apart from each other at regular intervals.

13. The damper of claim 1, wherein the notch portion and the communicating portion are provided to the first groove portions such that bubbles collected at the first groove portions are moved to the notch portion and the communicating portion.

14. The damper of claim 1, wherein the notch portion and the communicating portion are disposed at different positions in the axial direction.

15. The damper of claim 1, wherein the second groove portion is spaced apart from the notch portion and the communicating portion in the circumferential direction.

* * * * *